(12) United States Patent
Fu et al.

(10) Patent No.: US 12,515,371 B2
(45) Date of Patent: Jan. 6, 2026

(54) CONDUCTIVE FLEXIBLE TRANSPARENT WOOD FILM, PREPARATION METHOD THEREOF AND ELECTRONIC DEVICE

(71) Applicant: NANJING FORESTRY UNIVERSITY, Nanjing (CN)

(72) Inventors: Qiliang Fu, Nanjing (CN); Huashuo Ma, Nanjing (CN); Chaozheng Liu, Nanjing (CN); Zhi Yang, Nanjing (CN); Shuai Wu, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 205 days.

(21) Appl. No.: 18/589,442

(22) Filed: Feb. 28, 2024

(65) Prior Publication Data
US 2024/0383171 A1 Nov. 21, 2024

Related U.S. Application Data

(63) Continuation of application No. PCT/CN2023/096820, filed on May 29, 2023.

(30) Foreign Application Priority Data

May 18, 2023 (CN) .......................... 202310567138.9

(51) Int. Cl.
*B27K 5/06* (2006.01)
*B27N 1/00* (2006.01)
(Continued)

(52) U.S. Cl.
CPC ................ *B27N 7/005* (2013.01); *B27K 5/06* (2013.01); *B27N 1/00* (2013.01); *B27N 3/08* (2013.01)

(58) Field of Classification Search
CPC .......... D21C 9/144; D21C 9/14; D21B 1/021; B27K 5/06
See application file for complete search history.

(56) References Cited

U.S. PATENT DOCUMENTS

| | | | | |
|---|---|---|---|---|
| 2004/0241350 A1* | 12/2004 | Koga | ..................... | D21H 11/20 428/32.21 |
| 2012/0308624 A1* | 12/2012 | Isogai | .................... | A61K 8/345 424/401 |

(Continued)

FOREIGN PATENT DOCUMENTS

| CN | 113858368 A | 12/2021 |
|---|---|---|

OTHER PUBLICATIONS

Xiao Feng et al., High-performance carbon nanotube-cellulose nanofiber bulk materials with multifunctional applications in thermal management and shielding from electromagnetic interference, Journal of Materials Chemistry A, Sep. 2022, pp. 22271-22277.

*Primary Examiner* — Andrew D Graham
(74) *Attorney, Agent, or Firm* — Zhigang Ma

(57) ABSTRACT

A conductive flexible transparent wood film-based electronic device and its preparation method are provided. The preparation method is to remove most lignin and part hemicellulose from natural wood chips to prepare a transparent wood film, and a CNT/TOCNFs ink is printed on a surface of the transparent wood film to form a circuit. The as-prepared transparent wood film has high mechanical properties, flexibility, and excellent optical strength. The conductive flexible transparent wood film is fabricated by depositing the CNT/TOCNFs ink on the surface of the transparent wood film to form conductive circuits, which is combined with origami and kirigami to realize the editable and adjustable design of spatial structure. Thus, the shape of the flexible electronic devices changes from simple to com- (Continued)

plex, simultaneously, they are customized to meet specific needs or applications.

9 Claims, 10 Drawing Sheets

(51) Int. Cl.
 *B27N 3/08* (2006.01)
 *B27N 7/00* (2006.01)

(56) References Cited

U.S. PATENT DOCUMENTS

| | | | | |
|---|---|---|---|---|
| 2013/0338250 | A1* | 12/2013 | Umemoto | D01F 2/24 |
| | | | | 536/63 |
| 2014/0093918 | A1* | 4/2014 | Zhang | C08B 37/0057 |
| | | | | 435/99 |
| 2015/0184338 | A1* | 7/2015 | Luo | D21H 11/04 |
| | | | | 162/65 |
| 2015/0225550 | A1* | 8/2015 | Banzashi | C08L 1/02 |
| | | | | 106/163.01 |
| 2017/0206997 | A1* | 7/2017 | Al-Harthi | C08J 5/18 |
| 2018/0282946 | A1* | 10/2018 | Fushimi | D21H 17/07 |
| 2019/0023857 | A1* | 1/2019 | Shin | B01J 19/125 |
| 2019/0169377 | A1* | 6/2019 | Yasukawa | C08L 7/02 |
| 2024/0383171 | A1* | 11/2024 | Fu | B27N 1/00 |

* cited by examiner

CONDUCTIVE FLEXIBLE TRANSPARENT WOOD FILM, PREPARATION METHOD THEREOF AND ELECTRONIC DEVICE

TECHNICAL FIELD

The disclosure relates to the technical field of advanced functional wood, and particularly to a preparation method of the conductive flexible transparent wood film-based electronic device.

BACKGROUND

With the development of science and technology and in-depth research on electronic devices, flexible electronics have become one of the most popular research hotspots in recent years. However, there are still challenges in traditional flexible electronic devices with metal and plastic substrates, such as their insufficient interfacial bonding between the plastic substrate and the functional materials and poor durability, which is caused by the high temperature and high pressure preparation processes. In addition, these plastic substrates are generally incinerated and landfilled after the electronic devices have been used, and the large amount of carbon emissions generated by the incineration causes the pollution to the atmospheric environment, and the plastics in the landfill are difficult to degrade, which also seriously affects the soil environment and destroys the ecological balance. In order to alleviate these problems, resource-rich, green and environmentally friendly materials have been developed in the field of flexible electronic devices.

Wood, as a sustainable regenerative, green and biodegradable natural material, has a unique pore structure and a complex multilayered structure, showing excellent mechanical properties. In recent years, with the development of wood nanotechnology, researchers have developed wood-based advanced functional materials in various applications, such as energy-saving building materials, clean energy, wastewater treatment and optoelectronic devices. Among them, transparent wood-based material is a biomass-based material with high transparency, low thermal conductivity and environmental friendliness. The current fabrication of flexible electronic devices based on transparent wood-based materials mainly includes two strategies: a bottom-up method and a top-down method. The bottom-up method involves self-assembling nanocellulose and introducing conductive materials to construct cellulose films with high conductivity, high transparency, and high flexibility to achieve lightweight and flexible electronic device substrates. The top-down method removes most of the lignin and part of the hemicellulose from raw wood, and then densifies the delignified template to prepare wood films with high mechanical, flexible, and optical properties.

Theoretical and applied researches in the field of optoelectronic devices have gradually become an international hotspot of a frontier research, and the construction of conductive ink to form circuits on the surface of transparent wood films shows great potential for replacing plastic substrates. Relevant studies have shown that the delignified wood is used to prepare anisotropic films with high transparency and then coated with silver nanowire inks to produce ultra-thin, highly transparent films with excellent electrical conductivity, which are expected to be used in the cell phone screens. The electroluminescent device developed based on flexible transparent wood film shows good thermal stability and waterproof performance, and the low thermal expansion coefficient of the transparent wood film also provides good dimensional stability for the substrate in the device. By directly printing lignin-derived conductive ink on the transparent wood film substrate, an all-wood flexible film can be prepared for application in flexible strain sensors, showing more stable conductive properties than plastic. However, the current research in this field is still in the initial stage, and the relevant application scenarios are relatively single, merely limited to simple planar device design. Therefore, substrates applied to more complex shapes, interfaces and scenarios while ensuring the mechanical strength and performance are required for the rapid development of flexible electronic devices, and especially further breakthroughs are needed in the research of shape transformation and editing.

Origami and kirigami are processes that utilize logical changes in spatial conformation to design, fold, and cut, and thereby transforming a planar structure into a three-dimensional structure that is capable of designing deformations ranging from simple to complex shapes and endowing with intrinsic shape editability and shape deformation capabilities. The origami and kirigami have the advantages of simple design, high efficiency, flexibility, and versatility. Duc to its excellent editing and shape reproducibility, it is widely used to build three-dimensional structures and thin-film structures. In addition, making full utilizations of the natural wood compositions to construct the conductive ink with good conductivity and high efficiency can be conducive to providing a novel approach for the efficient use of the whole component of wood.

In summary, the transparent wood film is combined with three-dimensional (3D) printing and origami technologies for conducting electricity on wood components. The printed circuits can conduct electricity in one pass or multiple passes during deformation, and through the design of different forms of folding, reasonable design of the spatial folding angle or cutting path, all-wood-based flexible electronic devices with editable shapes can be realized. This design is expected to expand the potential application fields of the transparent wood film-constructed flexible electronic devices and increase the high-added value of the wood utilization.

SUMMARY

In view of this, an object of the disclosure is to present the integration of a transparent wood film (TWF) and cellulose-based conductive ink to achieve flexible electronic devices. The deformation of TWF electronic device is realized by folding it into a pre-designed shape from vertical and horizontal directions.

To achieve the above object, the disclosure provides the following technical solutions.

A preparation method of a conductive flexible transparent wood film includes steps as follows:
(1) performing a delignification treatment on a natural wood chip in an acidic buffer solution by using a NaClO$_2$ solution to remove lignin in the wood chip, and thereby obtaining a delignified wood chip;
(2) performing a hemicellulose removal treatment on the delignified woodchip in an alkaline solution to obtain a treated wood chip, placing the treated wood chip between a polyethersulfone membrane layer and a filter paper layer to be compressed under an external force for 24-48 hours (h) to obtain a transparent wood film;

(3) using wood powder and multi-walled carbon nanotubes (MWCNTs) as raw materials to prepare a carbon nanotubes/TEMPO-oxidized cellulose nanofibers (CNT/TOCNFs) ink; and (4) printing the CNT/TOCNFs ink onto a surface of the transparent wood film to form a circuit on the surface of the transparent wood film, thereby obtaining the conductive flexible transparent wood film.

In an embodiment, a preparation of the CNT/TOCNFs ink in step (3) includes the following steps:

(S1) performing oxidation with a 2,2,6,6-tetramethylpiperidinyloxy (TEMPO) oxidizer on the wood powder to prepare a cellulose fiber, dissolving the cellulose fiber in deionized water, followed by stirring and ultrasonicating to obtain a TEMPO-mediated oxidized cellulose nanofibers (TOCNFs) suspension; and (S2) adding the MWCNTs into the TOCNFs suspension, then stirring and ultra-sonicating the TOCNFs suspension added with the MWCNTs to obtain a mixed solution, and concentrating the mixed solution to obtain the CNT/TOCNFs ink in a form of gel.

In an embodiment, the TEMPO oxidizer in S1 is 8 millimole per gram (mmol/g), a diameter of TOCNFs in the suspension is in a range of 5-15 nanometers (nm), and a length of the TOCNFs in the suspension is in a range of 0.5-1 micrometer (μm).

In an embodiment, a concentration of the TOCNFs suspension is in a range of 0.2-0.8 weight percentage (wt %).

In an embodiment, a diameter of the MWCNTs in S2 is in a range of 5-15 nm and a length of the MWCNTs in S2 is in a range of 0.5-2 μm, and a carboxyl content of the MWCNTs in S2 is in a range of 3-5 wt %.

In an embodiment, a weight ratio of the TOCNFs to the MWCNTs in the mixed solution in S2 is (1-2):(1-2).

In an embodiment, a concentration of the mixed solution after the concentrating in S2 is in a range of 4-8 wt %.

The disclosure also provides a conductive flexible transparent wood film prepared according to the above technical scheme.

The disclosure further provides an editable wood flexible electronic device, which is obtained by editing the conductive flexible transparent wood film according to the above technical scheme.

The beneficial effects of the disclosure are as follows:
1. The flexible transparent wood film provided by the disclosure ensures its mechanical performance and also ensures its flexibility, and can be folded into a three-dimensional structure;
2. The flexible transparent wood film provided by the disclosure can be edited by folding the geometric structure, endowing it with shape programmability and deformation ability. By adjusting the folding angle, folding direction, thickness of the flexible transparent wood film, and thickness of the printed conductive ink during the folding/cutting process, a transparent wood film flexible electronic device can be constructed.

DETAILED DESCRIPTION OF EMBODIMENTS

Figure 1:
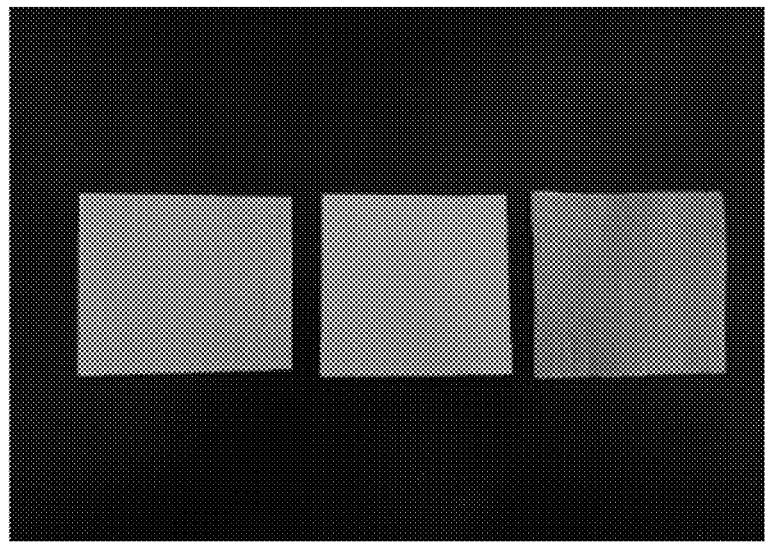
FIG. 1 illustrates a schematic diagram of a preparation process of a transparent wood film in an embodiment 1.

In order to have a clear understanding of the technical features, objectives, and beneficial effects of the disclosure, the technical solutions of the disclosure are described in detail below, but they cannot be understood as a limitation of the implementable scope of the disclosure.

Natural wood itself is opaque, so a preparation of transparent wood films for flexible electronics includes two main steps: light absorbing components need to be removed (including removing and modifying lignin) and refractive index differences in wood that do not match air also need to be reduced. The removal of lignin means removing components that absorb visible light from the wood, and the honeycomb like cell wall structure of the natural wood, and original fiber oriented arrangement and multi-layer assembly structure of the natural wood can still remain intact in the treated wood. In terms of reducing refractive index differences in the wood, transparent wood film densifies the delignified wood to form a transparent film. The delignified wood reduces the rigidity of the cell wall, making it more flexible and prone to collapse without breaking. During the collapse process, a stacked layered structure is formed, and a large number of hydrogen bonds are formed under the introduction of water molecules, resulting in a transparent wood film with dense cell wall interface bonding and a cellulose content of up to 90-98%. The disclosure adopts a top-down method to prepare transparent wood film. Compared with a bottom-up method, the top-down method can save the steps of separating and recombining cellulose, thus having significant advantages in production efficiency, reducing the use of chemical reagents, and reducing energy consumption. The top-down method directly converts the natural wood into transparent films with excellent mechanical and optical properties, making the entire processing process more environmentally friendly and efficient.

Based on the above principles, the disclosure provides a preparation method of a conductive flexible transparent wood film, including the following steps.

In the step (1), a delignification treatment is performed on a natural wood chip in an acidic buffer solution by using a $NaClO_2$ solution to remove lignin in the wood chip, and thereby obtaining a delignified wood chip. The acidic buffer solution is an acetic acid sodium acetate buffer solution with a potential of hydrogen (pH) of 4.6. A mass fraction of $NaClO_2$ in the $NaClO_2$ solution is 1%, and the delignification treatment includes heating the natural wood chip in a water bath at 80° C. for 6 hours.

In the step (2), a hemicellulose removal treatment is performed on the delignified wood chip in an alkaline solution to obtain a treated wood chip, the treated wood chip is placed between a polyethersulfone membrane layer and a filter paper layer to be compressed under an external force for 24-48 hours (h) to obtain a transparent wood film, a thickness of the transparent wood film can be reduced by about 80% to 95% after a densification (i.e. the compression). A concentration of the alkaline solution is 4 wt %, the alkaline solution is a sodium hydroxide (NaOH) solution, and a time of the hemicellulose removal treatment is 3-6 hours.

In the step (3), wood powder and MWCNTs are used as raw materials to prepare a CNT/TOCNFs ink, which specifically includes:
(S1) oxidation with a TEMPO oxidizer is performed on the wood powder to prepare a cellulose fiber with a high aspect ratio, the cellulose fiber is dissolved in deionized water, followed by stirring and ultra-sonicating to obtain a TEMPO-mediated oxidized cellulose nanofibers (TOCNFs) suspension. The TEMPO oxidizer is 8 mmol/g, a diameter of TOCNFs in the suspension is in a range of 5-15 nm, and a length of the TOCNFs in the suspension is in a range of 0.5-1 μm, and a content of TOCNFs in the suspension is in a range of 0.2-0.8 wt %; and
(S2) the MWCNTs are added into the TOCNFs suspension, then the mixed suspension MWCNTs is stirred and ultra-sonicated to obtain a uniformly dispersed solution, and the obtained solution is concentrated to obtain the CNT/TOCNFs ink in a form of gel. A diameter of the MWCNTs is in a range of 5-15 nm and a length of the MWCNTs is in a range of 0.5-2 μm, and a carboxyl content of the MWCNTs is in a range of 3-5 wt %. A weight ratio of the TOCNFs to the MWCNTs in the mixed solution is (1-2):(1-2), and a concentration of the mixed solution is in a range of 4-8 wt %. Air bubbles in the mixed solution are removed through a high-speed centrifugal defoaming mixer.

In the step (4), the CNT/TOCNFs ink is printed onto a surface of the transparent wood film to form a circuit on the surface of the transparent wood film, thereby obtaining the conductive flexible transparent wood film.

In the disclosure, the printing is carried out by using a bioprinter provided with a pneumatic dispenser. Specifically, the bioprinter includes a syringe and a needle, the syringe filled with the CNT/TOCNFs ink and the needle with diameter of 1 millimeter (mm) are assembled and connected to an air-controlled dispenser to adjust the printing pressure. The printing speed is controlled by using a NewCreatorK software associated with the three-dimensional (3D) printer, with a printing thickness of 1 mm. A model is designed by using 3D MAX 2019 software, and then the model is converted into G-code instructions for the printing stage using the NewCreatorK software, then the G code program is executed to print the circuit path on the surface of the transparent wood film. After printing, the transparent wood film is freeze-dried at −4° C. for 24 hours.

The disclosure also provides a conductive flexible transparent wood film prepared based on the above preparation method.

The disclosure further provides an editable wood flexible electronic device, which uses the above conductive flexible transparent wood film as the substrate, adopting a foldable and editable geometric shape folded through geometric design, and the folded shape can form a conductive path. The editable folding or the cropping shape designs are mainly composed of polygons such as triangles, rectangles, diamonds, or hexagons, which is obtained according to specific folding or cropping routes. The middle part of the design is a simplified Kreseling crease structure, which has rotational symmetry/folding/cropping. In the disclosure, a size of the transparent wood film is 50×50 square millimeters ($mm^2$), there are two types of creasing/cropping methods involved, which can be deformed by folding, stretching, or rotating, and a rotation angle range is −90° to 90°. The transparent wood film has high mechanical properties, flexibility, and excellent optical strength. The transparent wood film is constructed by depositing the CNT/TOCNFs ink on the surface of the transparent wood film to form conductive circuits. After spatial transformation such as folding or cutting the transparent wood film, the circuits can conduct electricity in one pass or multiple passes after the process of deformation. Therefore, the transparent wood film flexible electronic devices have the ability to undergo rapid deformation.

In order to better understand the disclosure, the content of the disclosure will be further elucidated in conjunction with embodiments, but the content of the disclosure is not limited to the following embodiments.

Embodiment 1

(1) 1 mm thick of natural Basha wood is cut into wood chips with 70×70 $mm^2$, then a delignification treatment is performed on the wood chips by using a $NaClO_2$ solution with a mass fraction of 1% in an acetic acid and sodium acetate buffer solution with a potential of hydrogen (pH) of 4.6 to heat in a water bath at 80° C. for 6 hours, thereby obtaining a wood sample. After the delignification, the wood sample is washed three times with deionized water under a low vacuum condition to remove residual chemical substances to obtain a delignified wood chip.

(2) A hemicellulose removal treatment is performed on the delignified wood chip in a NaOH solution to soak at a room temperature for 3 hours, then washed with the deionized water to obtain a treated wood chip, and the treated wood chip is placed between a polyethersulfone membrane layer and a filter paper layer to be compressed under an external force for 24 hours to obtain a transparent wood film.

Figure 3A:
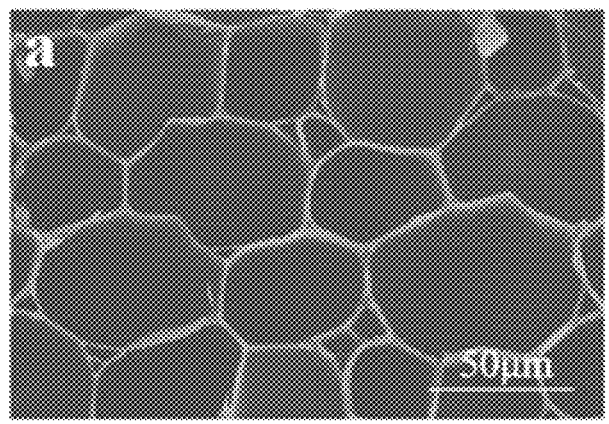
FIG. 3a illustrates a scanning electron microscope (SEM) image of an original wood chip in the embodiment 1.
Figure 3B:
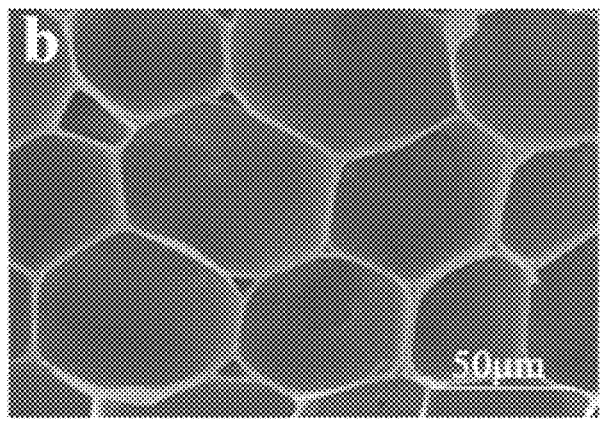
FIG. 3b illustrates a SEM image of a delignified wood chip in the embodiment 1.
Figure 3C:
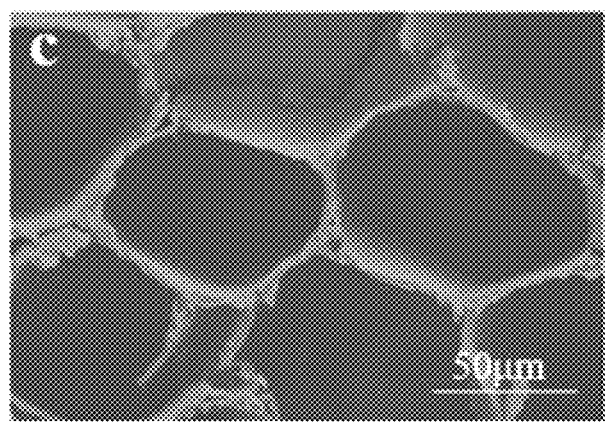
FIG. 3c illustrates a SEM image of a treated wood chip in the embodiment 1.
Figure 3D:
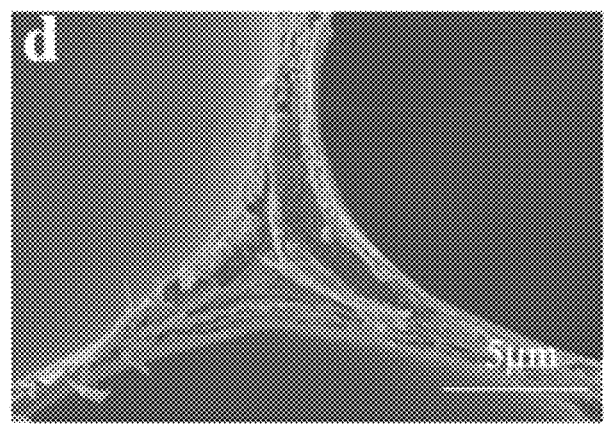
FIG. 3d illustrates a SEM image of changes in an intercellular angle of the original wood chip in the embodiment 1.
Figure 3E:
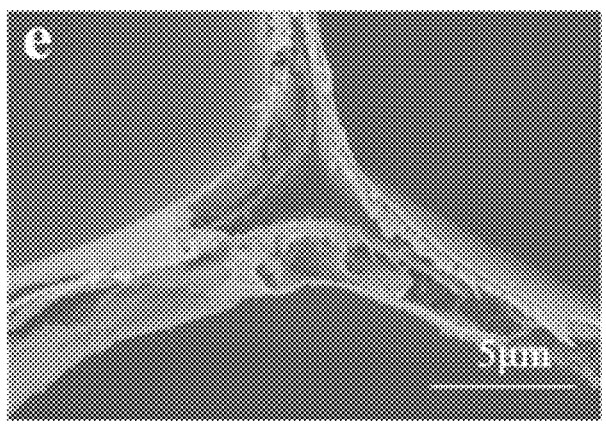
FIG. 3e illustrates a SEM image of changes in the intercellular angle of the delignified wood chip in the embodiment 1.
Figure 3F:
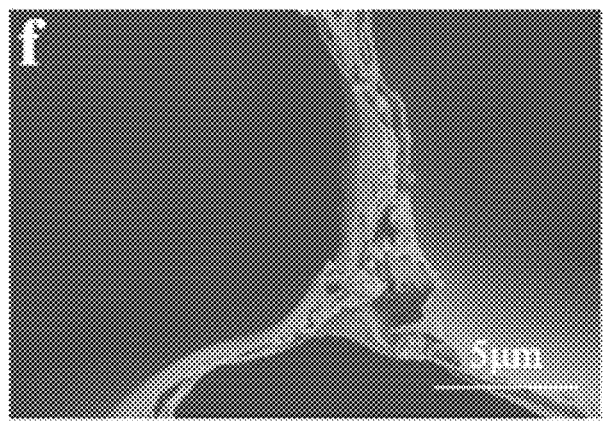
FIG. 3f illustrates a SEM image of changes in the intercellular angle of the treated wood chip in the embodiment 1.
Figure 4:
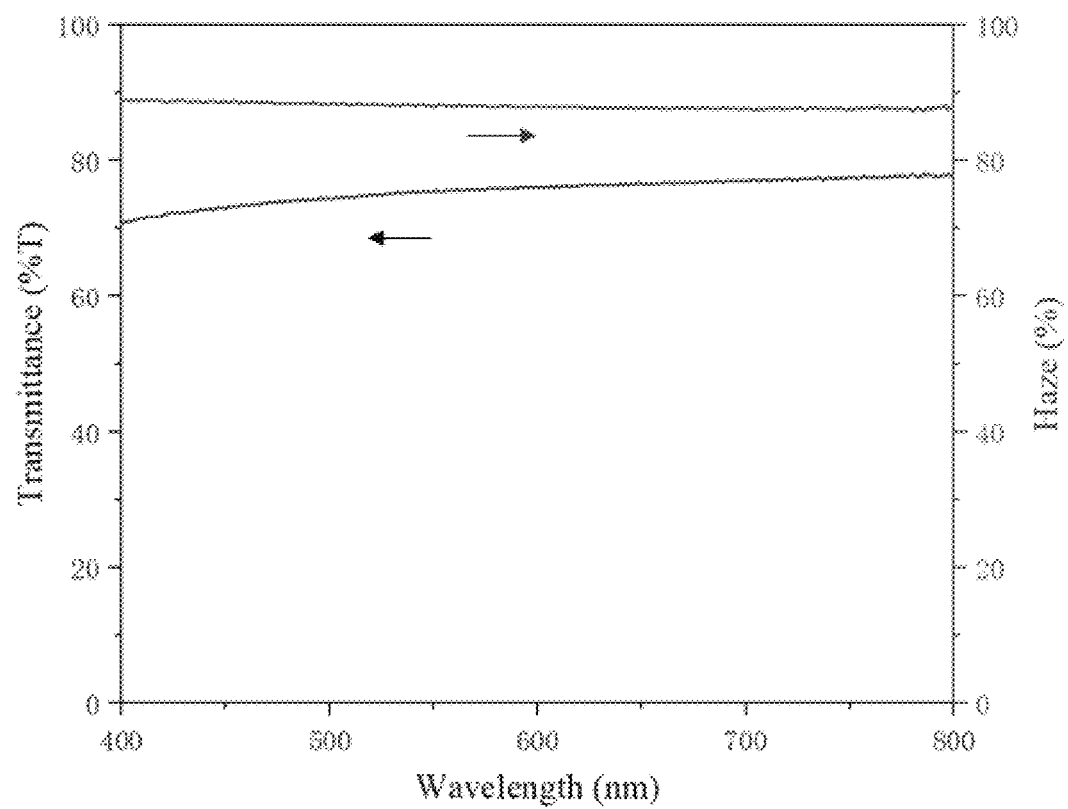
FIG. 4 illustrates a schematic diagram of a haze and a transmittance of the transparent wood film in the embodiment 1.

SEM characterization is performed on the original wood (i.e. nature wood chip), the delignified wood chip, and the treated wood chip. FIGS. 3a, 3b, and 3c illustrate the SEM images of the original wood, the delignified wood chip, and the treated wood chip, respectively. As shown in FIGS. 3a to 3c and 3d-3f, the lignin and the hemicellulose are removed, and cell walls of the wood gradually become thinner. FIGS. 3d, 3e and 3f illustrate changes in intercellular angles of the original wood, the delignified wood chip, and the treated wood chip, respectively.

Figure 2:
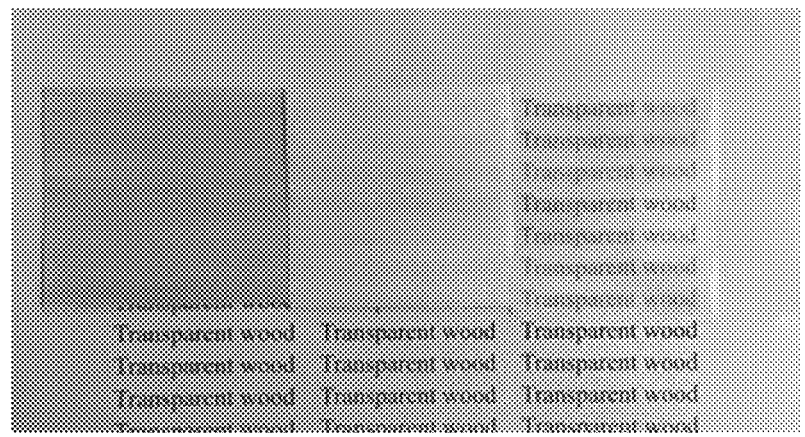
FIG. 2 illustrates a schematic diagram of an optical performance of the transparent wood film in the embodiment 1.

A transparency testing of the transparent wood film is tested, and as shown in FIG. 2, the obtained transparent wood film is transparent and meets the requirements of transparency.

Figure 5:
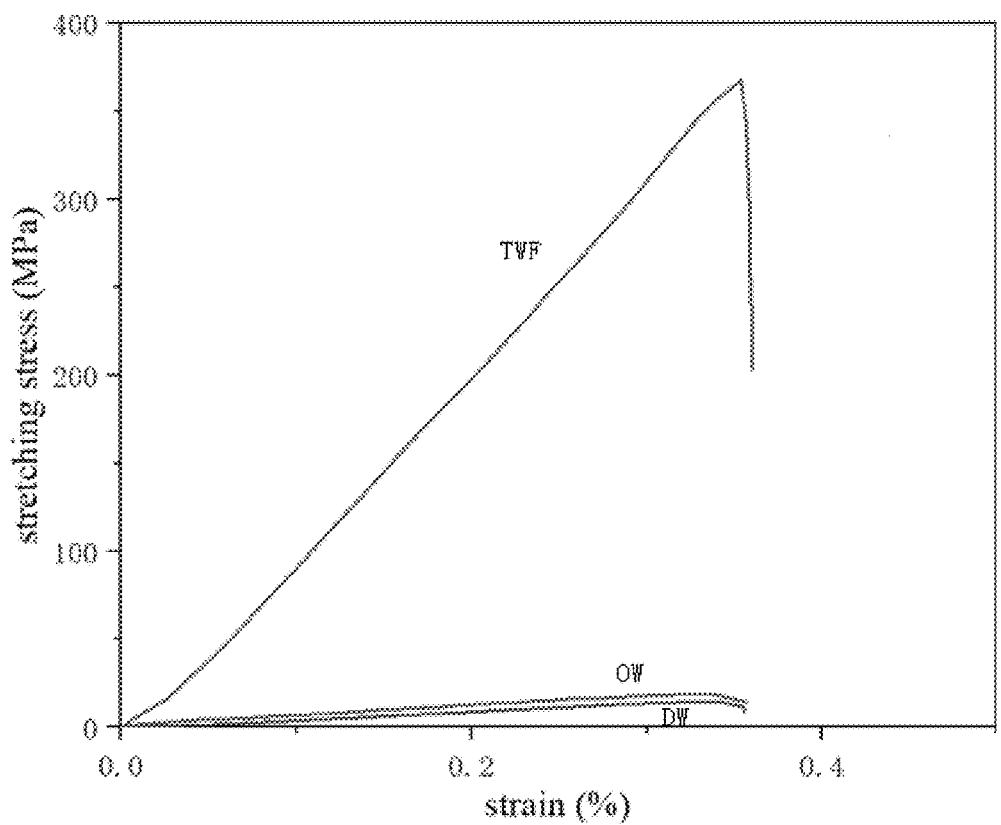
FIG. 5 illustrates a schematic diagram of mechanical properties of the original wood, the delignified wood chip, and the treated wood chip in the embodiment 1.
Figure 6:
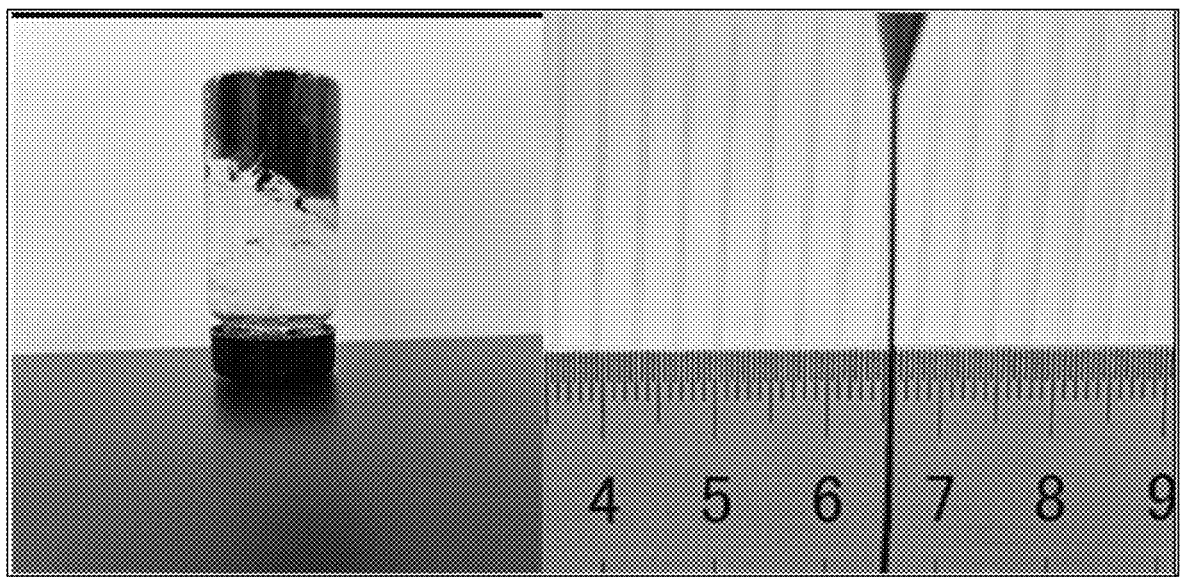
FIG. 6 illustrates a schematic diagram of an appearance and a morphology of a CNT/TOCNFs ink prepared in the embodiment 1.

Mechanical properties of the transparent wood film are tested, and according to FIG. 5, a tensile stress of the transparent wood film (TWF) can reach 393.9 megapascal (MPa), which is much higher than that of the original wood chip (OW) and the delignified wood chip (DW), meeting the requirements of mechanical performance.

The composition contents of the original wood and the transparent wood film are analyzed, as shown in Table 1. It can be seen that most of the lignin and the hemicellulose are removed from the transparent wood film.

TABLE 1

| Material | Lignin(%) | Hemicellulose(%) | Cellulose (%) | Mass loss (%) |
|---|---|---|---|---|
| Original wood | 24.2 ± 1.3 | 25.2 ± 1.5 | 50.6 ± 2.5 | — |
| Transparent wood film | 1.9 ± 0.4 | 10.5 ± 1.4 | 48.1 ± 1.8 | 39.5 ± 1.9 |

(3) Preparing a CNT/TOCNFs ink:

(S1) an oxidation with a TEMPO oxidizer of 8 mmol/g is performed on the wood powder to prepare a cellulose fiber with high aspect ratio, the cellulose fiber is dissolved in the deionized water, followed by stirring and ultra-sonicating to obtain a TOCNFs suspension. A diameter of TOCNFs in the suspension is in a range of 5-15 nm, and a length of the TOCNFs in the suspension is in a range of 0.5-1 μm, and a content of TOCNFs in the suspension is 0.2 wt %; and (S2) the MWCNTs are added into the TOCNFs suspension, a weight ratio of the TOCNFs to the MWCNTs in the mixed solution is 1:1, then the TOCNFs suspension added with the MWCNTs is stirred for 30 minutes and ultra-sonicated at 300 watt (W) for 1 hour to obtain a mixed solution, and the mixed solution is concentrated to obtain the mixed solution with a concentration of 4 wt %. Air bubbles in the mixed solution after the concentrating are removed through a high-speed centrifugal defoaming mixer, and thereby obtaining the CNT/TOCNFs ink.

(4) A Dr. INVIVO 4D bioprinter (ROKIT Healthcare, INC, South Korea) provided with a pneumatic dispenser is used, a syringe filled with the CNT/TOCNFs ink and a needle with diameter of 1 mm are assembled and connected to an air-controlled dispenser to adjust the printing pressure to 30 kilopascal (kPa). The printing speed is controlled by using a NewCreatorK software associated with the 3D printer, with a printing thickness of 1 mm. A model is designed using 3D MAX 2019 software, and then the model is converted into G-code instructions for the printing stage using the NewCreatorK software, then the G code program is executed to print the circuit path on the surface of the transparent wood film. After printing, the transparent wood film with the printed ink is freeze-dried at −4° C. for 24 hours.

Figure 9A:
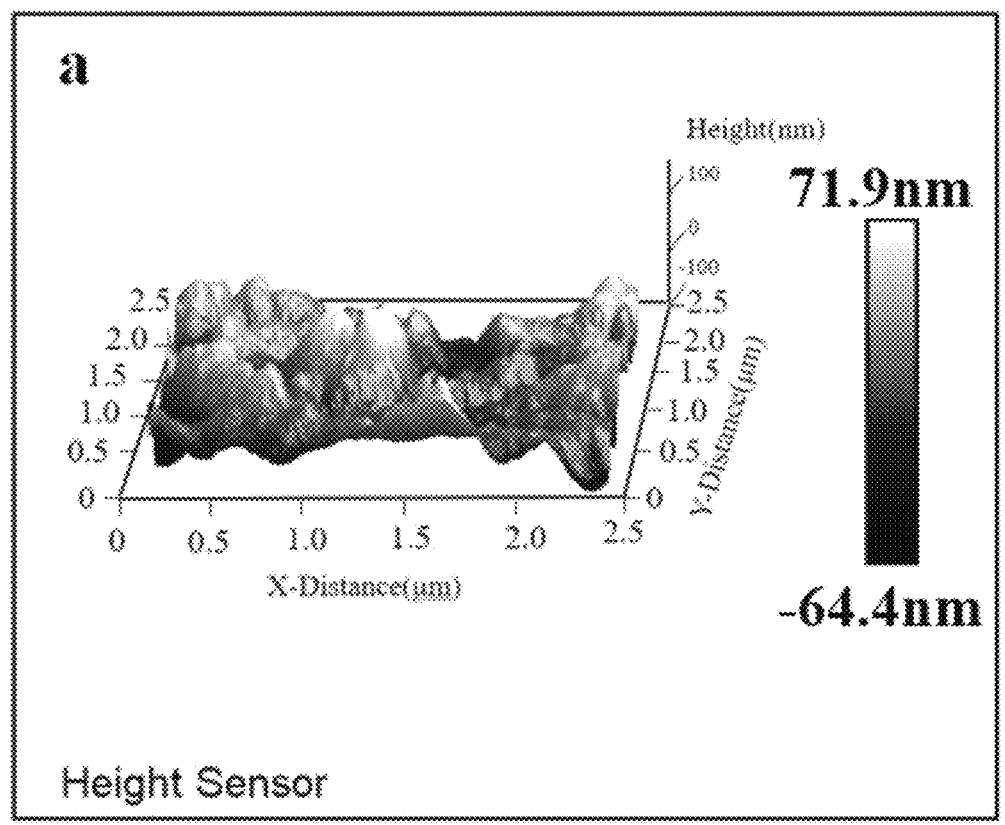
FIG. 9a illustrates an atomic force microscopy (AFM) image of the transparent wood film in the embodiment 1.
Figure 9B:
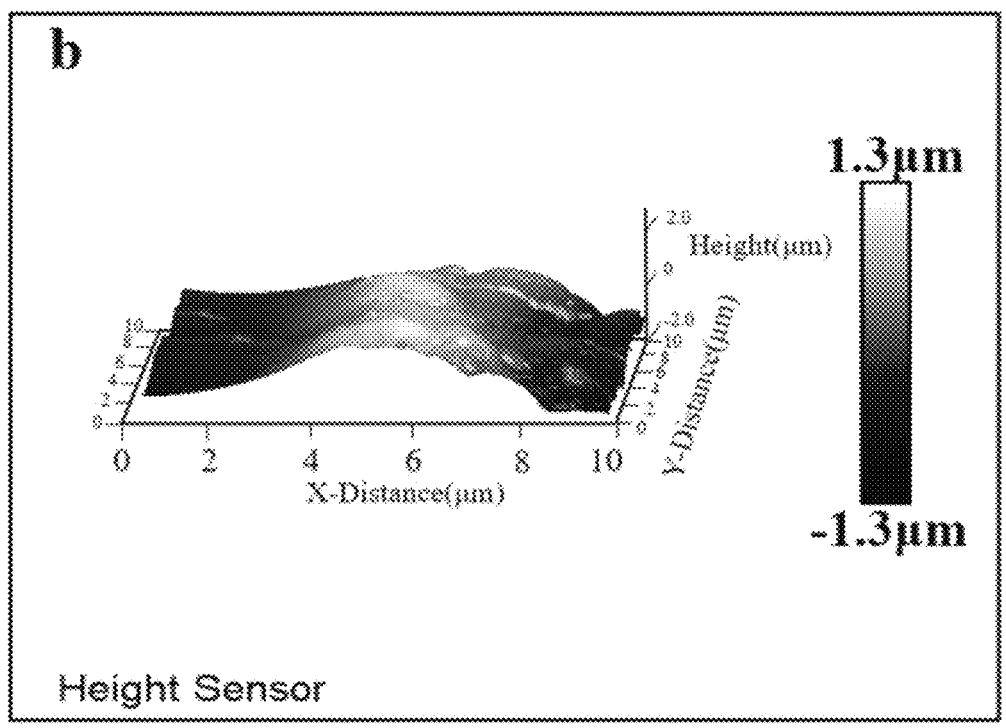
FIG. 9b illustrates an AFM image of the transparent wood film after 3D printing of the CNT/TOCNFs ink in the embodiment 1.

AFM microstructure characterization is performed on the transparent wood film printed with the CNT/TOCNFs ink. FIG. 9a illustrates a surface microstructure of the transparent wood film, and FIG. 9b illustrates a surface morphology of the transparent wood film after printing the CNT/TOCNFs ink. When printing the CNT/TOCNFs ink on electronic substrates, a surface roughness is an important parameter. As shown in FIGS. 9a and 9b, the surface roughness of the transparent wood film without the CNT/TOCNFs ink is approximately 150 nm in the Z-axis direction, and after printing the CNT/TOCNFs ink, the surface roughness of the transparent wood film printed with the CNT/TOCNFs ink reaches 2-3 μm in the Z-axis direction. And it shows obvious prominence along the linear line, proving that the CNT/TOCNFs ink prints along the predetermined route.

Figure 10A:
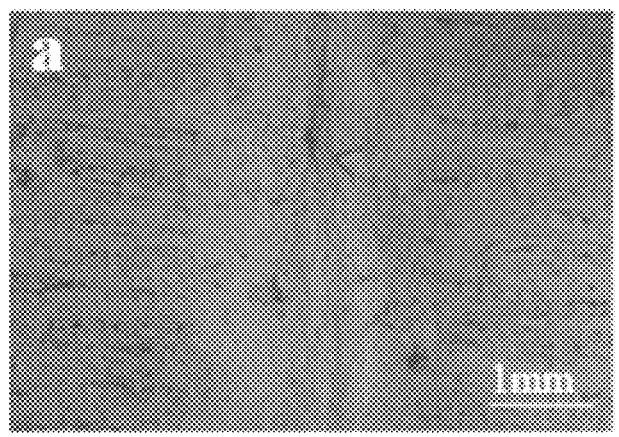
FIG. 10a illustrates a SEM image of a surface bonding between the transparent wood film and the wood chip in the embodiment 1.
Figure 10B:
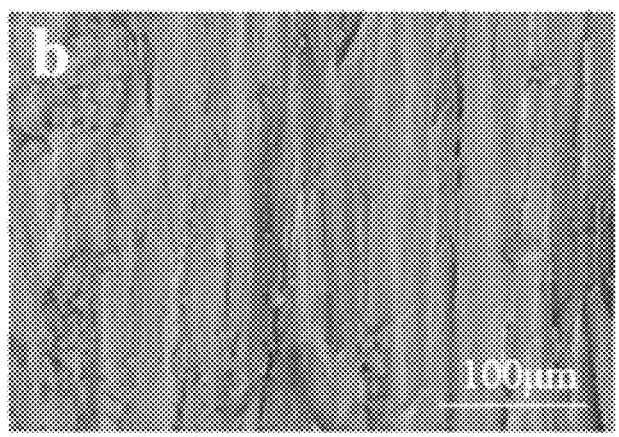
FIG. 10b illustrates a SEM image of a surface of the transparent wood film in the embodiment 1.
Figure 10C:
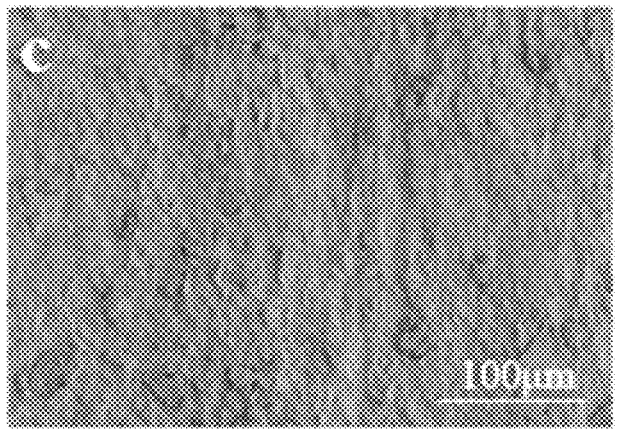
FIG. 10c illustrates a SEM image of a surface microstructure of the CNT/TOCNFs ink in the embodiment 1.
Figure 10D:
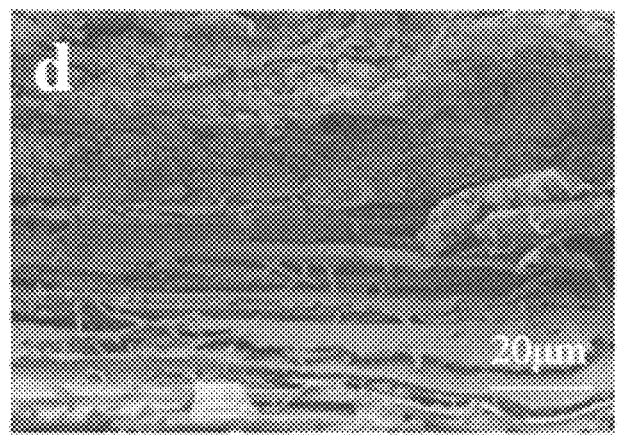
FIG. 10d illustrates a SEM image of a cross-section of the transparent wood film loaded with the CNT/TOCNFs ink under a magnification of 2200.
Figure 10E:
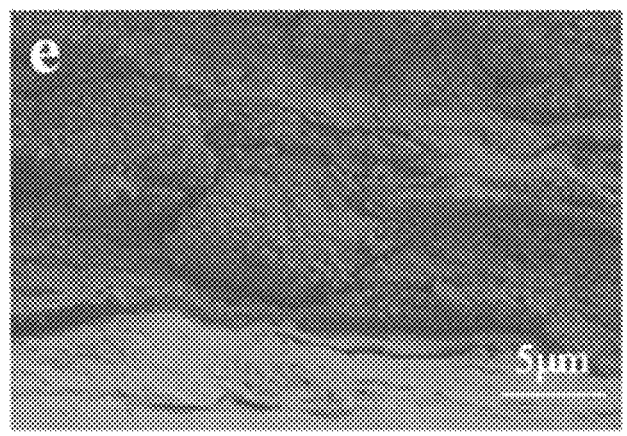
FIG. 10e illustrates a SEM image of a cross-section of the transparent wood film loaded with the CNT/TOCNFs ink under a magnification of 6000.
Figure 10F:
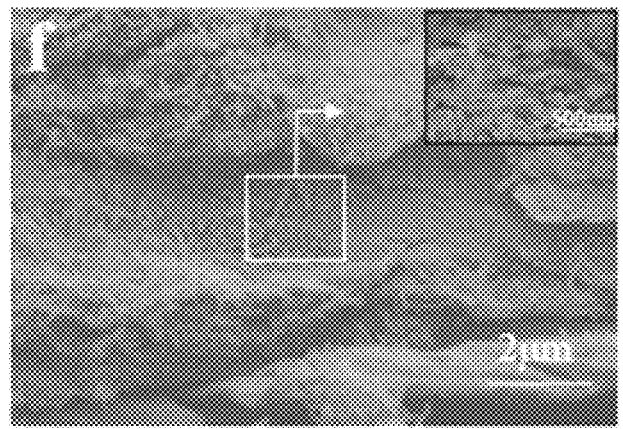
FIG. 10f illustrates a SEM image of a cross-section of the transparent wood film loaded with the CNT/TOCNFs ink under a magnification of 20000.

SEM characterization is performed on the transparent wood film printed with the CNT/TOCNFs ink. FIG. 10a illustrates a surface bonding between the transparent wood film and the wood film, FIG. 10b illustrates a surface of the transparent wood film, and FIG. 10c illustrates a surface microstructure of the CNT/TOCNFs ink. FIGS. 10d, 10e and 10f are the cross-sectional images of the transparent wood film loaded with the CNT/TOCNFs ink under different magnifications. As shown in FIG. 10d, a stacked brick wall-like cell structure of the transparent wood film after compression can be seen. As shown in FIG. 10e, the bonding status between the transparent wood film and the CNT/TOCNFs ink can be seen. As shown in FIG. 10f, a surface microstructure of the oxidized cellulose nanofibers in the CNT/TOCNFs ink can be observed.

Embodiment 2

(1) 1 mm thick of natural Basha wood is cut into wood chips with 70×70 mm², then a delignification treatment is performed on the wood chips by using a NaClO₂ solution with a mass fraction of 1% in an acetic acid and sodium acetate buffer solution with a pH of 4.6 to heat in a water bath at 80° C. for 6 hours, thereby obtaining a wood sample. After the delignification, the wood sample is washed three times with deionized water under a low vacuum condition to remove residual chemical substances to obtain a delignified wood chip.

(2) A hemicellulose removal treatment is performed on the delignified wood chip in a NaOH solution to soak at a room temperature for 6 hours, then washed with the deionized water to obtain a treated wood chip, and the treated wood chip is placed between a polyethersulfone membrane layer and a filter paper layer to be compressed under an external force for 48 hours to obtain a transparent wood film.

(3) Preparing a CNT/TOCNFs ink:

(S1) an oxidation with a TEMPO oxidizer of 8 mmol/g is performed on the wood powder to prepare a cellulose fiber with high aspect ratio, the cellulose fiber is dissolved in the deionized water, followed by stirring and ultra-sonicating to obtain a TOCNFs suspension. A diameter of TOCNFs in the suspension is in a range of 5-15 nm, and a length of the TOCNFs in the suspension is in a range of 0.5-1 µm, and a content of TOCNFs in the suspension is 0.4 wt %; and (S2) the MWCNTs are added into the TOCNFs suspension, a weight ratio of the TOCNFs to the MWCNTs in the mixed solution is 1:2, then the TOCNFs suspension added with the MWCNTs is stirred for 30 minutes and ultra-sonicated at 300 W for 1 hour to obtain a mixed solution, and the mixed solution is concentrated to 4 wt %. Air bubbles in the mixed solution after the concentrating are removed through a high-speed centrifugal defoaming mixer, and thereby obtaining the CNT/TOCNFs ink.

(4) A Dr. INVIVO 4D bioprinter (ROKIT Healthcare, INC, South Korea) provided with a pneumatic dispenser is used, a syringe filled with the CNT/TOCNFs ink and a needle with diameter of 1 mm are assembled and connected to an air-controlled dispenser to adjust the printing pressure to 30 kPa. The printing speed is controlled by using a NewCreatorK software associated with the 3D printer, with a printing thickness of 1 mm. A model is designed using 3D MAX 2019 software, and then the model is converted into G-code instructions for the printing stage using the NewCreatorK software, then the G code program is executed to print the circuit path on the surface of the transparent wood film. After printing, the transparent wood film is freeze-dried at −4° C. for 24 hours.

Embodiment 3

(1) 1 mm thick of natural Basha wood is cut into wood chips with 70×70 mm$^2$, then a delignification treatment is performed on the wood chips by using a NaClO$_2$ solution with a mass fraction of 1% in an acetic acid and sodium acetate buffer solution with a pH of 4.6 to heat in a water bath at 80° C. for 6 hours, and thereby obtaining a wood sample. After the delignification, the wood sample is washed three times with deionized water under a low vacuum condition to remove residual chemical substances to obtain a delignified wood chip.

(2) A hemicellulose removal treatment is performed on the delignified wood chip in a NaOH solution to soak at a room temperature for 5 hours, then washed with the deionized water to obtain a treated wood chip, and the treated wood chip is placed between a polyethersulfone membrane layer and a filter paper layer to be compressed under an external force for 36 hours to obtain a transparent wood film.

(3) Preparing a CNT/TOCNFs ink:

(S1) an oxidation with a TEMPO oxidizer of 8 mmol/g is performed on the wood powder to prepare a cellulose fiber with high aspect ratio, the cellulose fiber is dissolved in the deionized water, followed by stirring and ultra-sonicating to obtain a TOCNFs suspension. A diameter of TOCNFs in the suspension is in a range of 5-15 nm, and a length of the TOCNFs in the suspension is in a range of 0.5-1 µm, and a content of TOCNFs in the suspension is 0.6 wt %; and (S2) the MWCNTs are added into the TOCNFs suspension, a weight ratio of the TOCNFs to the MWCNTs in the mixed solution is 2:1, then the TOCNFs suspension added with the MWCNTs is stirred for 30 minutes and ultra-sonicated at 300 W for 1 hour to obtain a mixed solution, and the mixed solution is concentrated to 4 wt %. Air bubbles in the mixed solution after the concentrating are removed through a high-speed centrifugal defoaming mixer, and thereby obtaining the CNT/TOCNFs ink.

(4) A Dr. INVIVO 4D bioprinter (ROKIT Healthcare, INC, South Korea) provided with a pneumatic dispenser is used, a syringe filled with the CNT/TOCNFs ink and a needle with diameter of 1 mm are assembled and connected to an air-controlled dispenser to adjust the printing pressure to 30 kPa. The printing speed is controlled by using a NewCreatorK software associated with the 3D printer, with a printing thickness of 1 mm. A model is designed using 3D MAX 2019 software, and then the model is converted into G-code instructions for the printing stage using the NewCreatorK software, then the G code program is executed to print the circuit path on the surface of the transparent wood film. After printing, the transparent wood film is freeze-dried at −4° C. for 24 hours.

Embodiment 4

(1) 1 mm thick of natural Basha wood is cut into wood chips with 70×70 mm$^2$, then a delignification treatment is performed on the wood chips by using a NaClO$_2$ solution with a mass fraction of 1% in an acetic acid and sodium acetate buffer solution with a pH of 4.6 to heat in a water bath at 80° C. for 6 hours, and thereby obtaining a wood sample. After the delignification, the wood sample is washed for three times with deionized water under a low vacuum condition to remove residual chemical substances to obtain a delignified wood chip.

(2) A hemicellulose removal treatment is performed on the delignified wood chip in a NaOH solution at a room temperature for 5 hours, then washed with the deionized water to obtain a treated wood chip, and the treated wood chip is placed between a polyethersulfone membrane layer and a filter paper layer to be compressed under an external force for 36 hours to obtain a transparent wood film.

(3) Preparing a CNT/TOCNFs ink:

(S1) an oxidation with a TEMPO oxidizer of 8 mmol/g is performed on the wood powder to prepare a cellulose fiber with high aspect ratio, the cellulose fiber is dissolved in the deionized water, followed by stirring and ultra-sonicating to obtain a TOCNFs suspension. A diameter of TOCNFs in the suspension is in a range of 5-15 nm, and a length of the TOCNFs in the suspension is in a range of 0.5-1 µm, and a content of TOCNFs in the suspension is 0.8 wt %; and (S2) the MWCNTs are added into the TOCNFs suspension, a weight ratio of the TOCNFs to the MWCNTs in the mixed solution is 2:1, then the TOCNFs suspension added with the MWCNTs is stirred for 30 minutes and ultra-sonicated at 300 W for 1 hour to obtain a mixed solution, and the mixed solution is concentrated to 4 wt %. Air bubbles in the mixed solution after the concentrating are removed through a high-speed centrifugal defoaming mixer, and thereby obtaining the CNT/TOCNFs ink.

Figure 7:
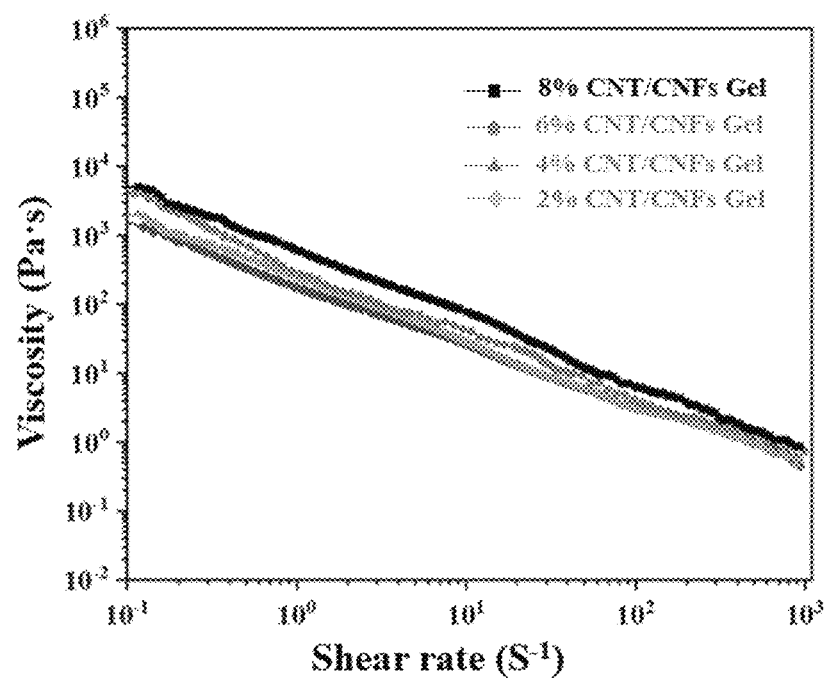
FIG. 7 illustrates a schematic diagram of rheological properties characterization of the CNT/TOCNFs inks prepared in the embodiments 1-4.
Figure 8:
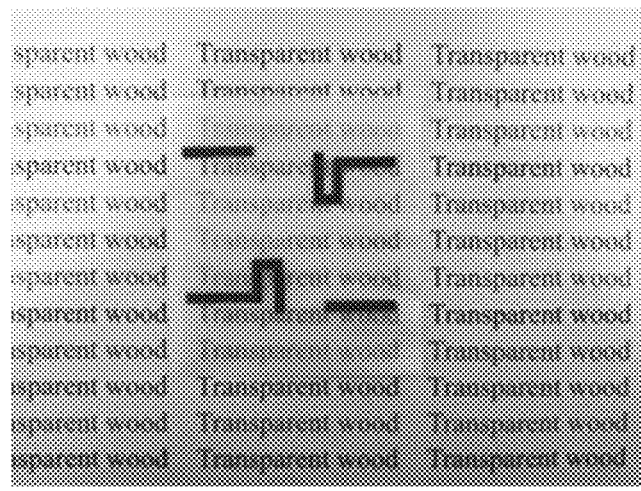
FIG. 8 illustrates a schematic diagram of a surface of the transparent wood film printed with the CNT/TOCNFs ink in the embodiment 1.

For direct-ink-writing technology by 3D printing, the printability of ink (such as extrudability, filament formation, shape fidelity, and geometric accuracy) largely depends on its rheological properties. 3D printable ink should have excellent shear thinning ability, which could be able to smoothly extrude ink through deposition nozzles and form smooth filaments under shear force. The rheological properties of the CNT/TOCNFs ink are characterized. As shown in FIG. 7, in the embodiments 1-4, the steady-state viscosity of the CNT/TOCNFs suspensions with the concentrations of 2%, 4%, 6%, and 8% at a shear rate of $10^{-1}$ $s^{-1}$ are 13.19 kPa $s^{-1}$, 20.13 kPa $s^{-1}$, 32.87 kPa $s^{-1}$, and 40.43 kPa $s^{-1}$, respectively. It can be observed that the suspensions exhibit significant shear thinning behavior. Thus, this can ensure that the CNT/TOCNFs ink flows out of narrow holes uniformly under the driving force of printing pressure to form a conductive circuit.

(4) A Dr. INVIVO 4D bioprinter (ROKIT Healthcare, INC, South Korea) provided with a pneumatic dispenser is used, a syringe filled with the CNT/TOCNFs ink and a needle with diameter of 1 mm are assembled and connected to an air-controlled dispenser to adjust the printing pressure to 30 kPa. The printing speed is controlled by using a NewCreatorK software associated with the 3D printer, with a printing thickness of 1 mm. A model is designed using 3D MAX 2019 software, and then the model is converted into G-code instructions for the printing stage using the NewCreatorK software, then the G code program is executed to print the circuit path on the surface of the transparent wood film. After printing, the transparent wood film is freeze-dried at −4° C. for 24 hours.

The surface roughness of the transparent wood film obtained from the embodiments 1-4 are tested, and the test results are shown in Table 2:

TABLE 2

|  | average roughness Ra (μm) | Peak-valley roughness Rz (μm) |
| --- | --- | --- |
| Embodiment 1 | 0.299 | 2.183 |
| Embodiment 2 | 0.436 | 2.882 |
| Embodiment 3 | 0.303 | 2.036 |
| Embodiment 4 | 0.472 | 2.673 |

According to Table 2, the low surface roughness of the transparent wood film is conducive to good adhesion of the CNT/TOCNFs ink to surface of the transparent wood film during printing.

Embodiment 5

Figure 11:
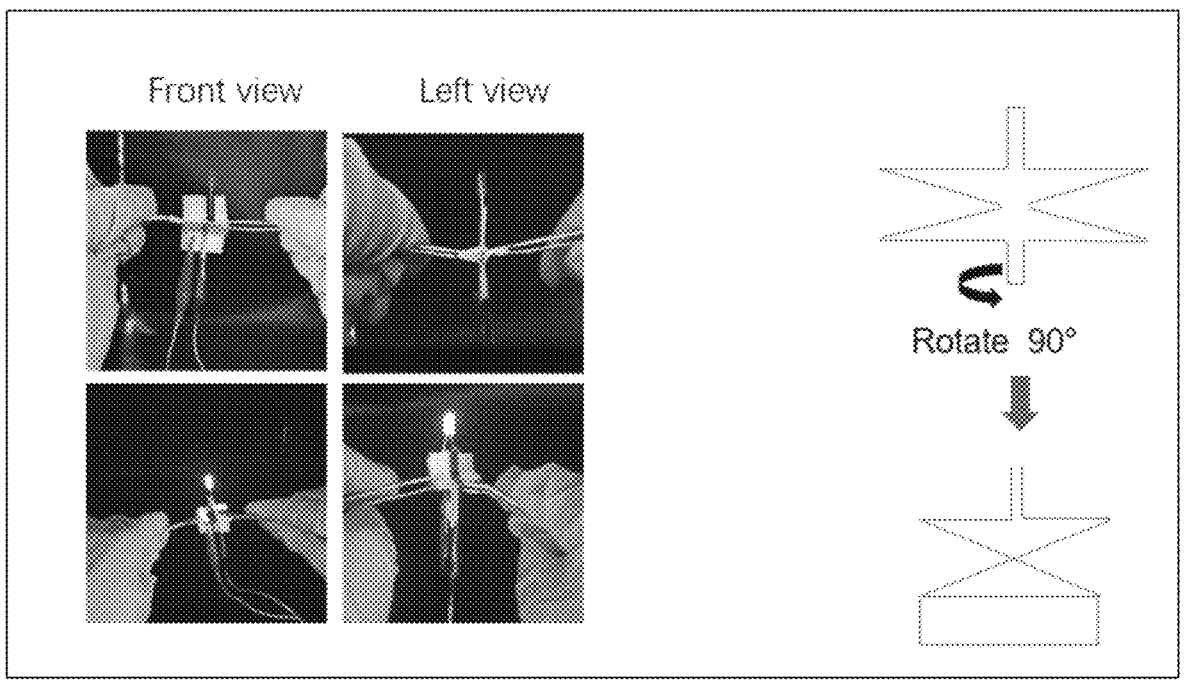
FIG. 11 illustrates a schematic diagram of folding and application of a transparent wood film flexible electronic device in the embodiment 5.

The transparent wood film obtained from the embodiment 1 is folded to obtain an editable wood flexible electronic device (i.e., transparent wood film-based flexible electronic device). FIG. 11 illustrates a schematic diagram of folding and application of the editable wood flexible electronic device.

The above are only preferred embodiments of the disclosure. It should be pointed out that for those skilled in the art, several improvements and embellishments can be made without departing from the principles of the disclosure, and these improvements and embellishments should also be considered as the scope of protection of the disclosure.

What is claimed is:

1. A preparation method of a conductive flexible transparent wood film, comprising the following steps:
   (1) performing a delignification treatment on a wood chip in an acidic buffer solution by using a sodium chlorite ($NaClO_2$) solution to remove lignin in the wood chip, and thereby obtaining a delignified wood chip;
   (2) performing a hemicellulose removal treatment on the delignified wood chip in an alkaline solution to obtain a treated wood chip, placing the treated wood chip between a polyethersulfone membrane layer and a filter paper layer to be compressed under an external force for 24-48 hours (h) to obtain a transparent wood film;
   (3) using wood powder and multi-walled carbon nanotubes (MWCNTs) as raw materials to prepare a carbon nanotubes/TEMPO-oxidized cellulose nanofibers (CNT/TOCNFs) ink; and
   (4) printing the CNT/TOCNFs ink onto a surface of the transparent wood film to form a circuit on the surface of the transparent wood film, and thereby obtaining the conductive flexible transparent wood film-based electronic device.

2. The preparation method as claimed in claim 1, wherein the step (3) comprises the following steps:
   (S1) performing oxidation with a 2,2,6,6-tetramethylpiperidinyloxy (TEMPO) oxidizer on the wood powder to prepare a cellulose fiber, dissolving the cellulose fiber in deionized water, followed by stirring and ultrasonicating to obtain a TEMPO-mediated oxidized cellulose nanofibers (TOCNFs) suspension; and
   (S2) adding the MWCNTs into the TOCNFs suspension, then stirring and ultra-sonicating the TOCNFs suspension added with the MWCNTs to obtain a mixed solution, and concentrating the mixed solution to obtain the CNT/TOCNFs ink in a form of gel.

3. The preparation method as claimed in claim 2, wherein the TEMPO oxidizer in S1 is 8 millimole per gram (mmol/g), a diameter of TOCNFs in the suspension is in a range of 5-15 nanometers (nm), and a length of the TOCNFs in the suspension is in a range of 0.5-1 micrometer (μm).

4. The preparation method as claimed in claim 2, wherein a content of TOCNFs in the TOCNFs suspension is in a range of 0.2-0.8 weight percentage (wt %).

5. The preparation method as claimed in claim 2, wherein a diameter of the MWCNTs in S2 is in a range of 5-15 nm and a length of the MWCNTs in S2 is in a range of 0.5-2 μm, and a carboxyl content of the MWCNTs in S2 is in a range of 3-5 wt %.

6. The preparation method as claimed in claim 2, wherein a weight ratio of the TOCNFs to the MWCNTs in the mixed solution in S2 is (1-2):(1-2).

7. The preparation method as claimed in claim 2, wherein a concentration of the mixed solution after the concentrating in S2 is in a range of 4-8 wt %.

8. The conductive flexible transparent wood film prepared by the preparation method as claimed in claim 1.

9. An editable wood flexible electronic device, wherein the editable wood flexible electronic device is obtained by editing the conductive flexible transparent wood film as claimed in claim 8.

* * * * *